United States Patent
Holbrook et al.

(10) Patent No.: US 10,798,000 B2
(45) Date of Patent: Oct. 6, 2020

(54) METHOD AND APPARATUS OF COMPRESSING NETWORK FORWARDING ENTRY INFORMATION

(71) Applicant: Arista Networks, Inc., Santa Clara, CA (US)

(72) Inventors: Hugh W. Holbrook, Palo Alto, CA (US); Francois Labonte, Menlo Park, CA (US); Eitan Joffe, Palo Alto, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 14/710,513

(22) Filed: May 12, 2015

(65) Prior Publication Data

US 2016/0182372 A1 Jun. 23, 2016

Related U.S. Application Data

(60) Provisional application No. 62/095,572, filed on Dec. 22, 2014.

(51) Int. Cl.
*H04L 12/745* (2013.01)
*H04L 29/12* (2006.01)

(52) U.S. Cl.
CPC ........ *H04L 45/748* (2013.01); *H04L 61/6059* (2013.01); *H04L 61/6072* (2013.01)

(58) Field of Classification Search
None
See application file for complete search history.

(56) References Cited

U.S. PATENT DOCUMENTS

| | | | | |
|---|---|---|---|---|
| 5,781,772 A * | 7/1998 | Wilkinson, III | .. | G06F 17/30985 370/229 |
| 6,011,795 A | 1/2000 | Varghese | .......... | H04L 29/12132 370/392 |
| 6,018,524 A | 1/2000 | Turner | .................... | H04L 45/00 370/392 |
| 6,067,574 A * | 5/2000 | Tzeng | ............... | G06F 15/17337 707/999.101 |
| 6,212,184 B1 * | 4/2001 | Venkatachary | ......... | H04L 45/00 370/238 |
| 6,631,419 B1 * | 10/2003 | Greene | ................... | H04L 45/54 370/392 |
| 6,968,391 B2 * | 11/2005 | Brennan | ............... | H04L 49/351 370/401 |

(Continued)

FOREIGN PATENT DOCUMENTS

EP  2214355 A1  8/2010  ......... H04L 45/7457

*Primary Examiner* — Xavier S Wong
(74) *Attorney, Agent, or Firm* — Haley Guiliano LLP

(57) ABSTRACT

A method and apparatus of a device that determines a match for a compressed address using an exact match table of a network element is described. In an exemplary embodiment, the network element receives a data packet that has a destination address. The network element further compresses the destination address to give a compressed address. In addition, the network element performs an address lookup using the compressed address in an exact match table. Furthermore, a match in the address lookup indicates a transmitting interface of the network element. The network element forwards the data packet using the transmitting interface.

13 Claims, 10 Drawing Sheets

(56) References Cited

U.S. PATENT DOCUMENTS

| | | | |
|---|---|---|---|
| 7,002,965 B1* | 2/2006 | Cheriton | G06F 17/30949 370/392 |
| 7,043,494 B1 | 5/2006 | Joshi | G06F 17/30961 |
| 7,289,502 B1* | 10/2007 | Gemelli | H04L 45/00 370/392 |
| 7,301,945 B1* | 11/2007 | Ooms | H04L 45/00 370/390 |
| 7,664,881 B2 | 2/2010 | Le Pennec | H03M 7/3066 709/227 |
| 8,090,805 B1* | 1/2012 | Chawla | H04L 12/00 709/221 |
| 8,111,697 B1* | 2/2012 | Panwar | H04L 63/0263 370/392 |
| 8,639,875 B1* | 1/2014 | Estan | G06F 12/00 707/769 |
| 8,675,648 B1* | 3/2014 | Goel | H04L 49/10 370/389 |
| 8,949,467 B1* | 2/2015 | Flanagan | H04L 69/04 709/247 |
| 9,173,129 B2* | 10/2015 | Kahng | H04L 61/6072 |
| 9,270,592 B1* | 2/2016 | Sites | H04L 45/7453 |
| 9,306,851 B1* | 4/2016 | Gazit | H04L 45/748 |
| 9,609,090 B2* | 3/2017 | Lee | H04L 69/22 |
| 9,680,749 B2* | 6/2017 | Labonte | H04L 45/748 |
| 2002/0059435 A1* | 5/2002 | Border | H04B 7/18582 709/228 |
| 2002/0078196 A1* | 6/2002 | Kim | H04L 12/4608 709/224 |
| 2003/0028713 A1 | 2/2003 | Khanna | G11C 15/04 711/108 |
| 2003/0035000 A1 | 2/2003 | Licon | G06F 17/30867 715/747 |
| 2003/0225901 A1 | 12/2003 | Krishnan | |
| 2003/0233516 A1* | 12/2003 | Davis | H04L 45/745 709/223 |
| 2004/0015607 A1* | 1/2004 | Bender | H04L 29/12009 709/238 |
| 2004/0024903 A1* | 2/2004 | Costatino | H04L 69/22 711/108 |
| 2004/0057579 A1* | 3/2004 | Fahrny | G06Q 20/3674 380/44 |
| 2004/0073715 A1 | 4/2004 | Folkes | H04L 45/00 709/250 |
| 2004/0085953 A1 | 5/2004 | Davis | H04L 45/00 370/356 |
| 2004/0111439 A1 | 6/2004 | Richardson | G06F 17/30985 |
| 2004/0111440 A1 | 6/2004 | Richardson | G06F 17/30625 |
| 2004/0122794 A1 | 6/2004 | Gwizdaloski | G06F 17/245 |
| 2004/0133590 A1 | 7/2004 | Henderson | G06F 17/30327 |
| 2004/0139274 A1 | 7/2004 | Hui | |
| 2004/0205234 A1* | 10/2004 | Barrack | H04L 45/745 709/238 |
| 2004/0215609 A1 | 10/2004 | Takatsu | H04L 45/00 |
| 2004/0230696 A1* | 11/2004 | Barach | H04L 45/00 709/238 |
| 2004/0236720 A1 | 11/2004 | Basso et al. | |
| 2004/0243563 A1 | 12/2004 | Heiner | |
| 2004/0249803 A1 | 12/2004 | Vankatachary | H04L 45/00 |
| 2004/0264374 A1 | 12/2004 | Yu et al. | |
| 2005/0083935 A1 | 4/2005 | Kounavis | H04L 45/00 370/392 |
| 2005/0100012 A1 | 5/2005 | Kaxiras | H04L 45/742 370/389 |
| 2005/0111494 A1* | 5/2005 | Kecskemeti | H04L 29/12009 370/521 |
| 2005/0120017 A1 | 6/2005 | Motoki | G06F 17/30985 |
| 2005/0138322 A1* | 6/2005 | Guerrero | H04L 69/22 711/220 |
| 2005/0141519 A1* | 6/2005 | Rajgopal | H04L 45/00 370/395.32 |
| 2005/0144553 A1 | 6/2005 | Bass | G06F 17/30985 715/231 |
| 2006/0106940 A1* | 5/2006 | Jagannathan | H04L 69/16 709/238 |
| 2006/0259628 A1* | 11/2006 | Vadlapudi | H04W 28/24 709/227 |
| 2007/0008962 A1* | 1/2007 | Basu | H04L 45/00 370/389 |
| 2007/0094441 A1 | 4/2007 | Kim | G11C 15/00 711/108 |
| 2007/0294502 A1 | 12/2007 | Gunther | G06F 17/2247 711/173 |
| 2008/0222094 A1 | 9/2008 | Cox | G06F 19/22 |
| 2009/0019219 A1* | 1/2009 | Magklis | G06F 12/0833 711/105 |
| 2009/0080452 A1 | 3/2009 | Ra et al. | |
| 2010/0142560 A1* | 6/2010 | Sharivker | H04L 29/12839 370/475 |
| 2010/0195654 A1 | 8/2010 | Jacobson | H04L 45/7457 370/392 |
| 2010/0195655 A1* | 8/2010 | Jacobson | H04L 45/00 370/392 |
| 2010/0205135 A1 | 8/2010 | Ongole | G06F 17/30985 706/48 |
| 2010/0309795 A1 | 12/2010 | Shah | H04L 45/00 370/252 |
| 2011/0283061 A1 | 1/2011 | Reddy | |
| 2011/0060876 A1 | 3/2011 | Liu | G06F 17/30949 711/108 |
| 2011/0128959 A1* | 6/2011 | Bando | H04L 45/745 370/392 |
| 2012/0023082 A1* | 1/2012 | Kotha | G06F 17/30625 707/706 |
| 2012/0136889 A1* | 5/2012 | Jagannathan | H04L 49/3009 707/769 |
| 2012/0163180 A1* | 6/2012 | Goel | H04L 45/30 370/238 |
| 2013/0031077 A1* | 1/2013 | Liu | G06F 7/02 707/706 |
| 2013/0064246 A1* | 3/2013 | Dharmapurikar | H04L 49/351 370/392 |
| 2013/0097336 A1* | 4/2013 | Lu | H04L 61/6004 709/245 |
| 2013/0246698 A1 | 9/2013 | Estan | G11C 7/1072 711/108 |
| 2013/0301641 A1* | 11/2013 | Anand | H04L 63/0227 370/389 |
| 2014/0003343 A1* | 1/2014 | Kwon | H04W 40/02 370/328 |
| 2014/0064259 A1* | 3/2014 | Lee | H04L 69/04 370/338 |
| 2014/0153573 A1 | 6/2014 | Ramesh | |
| 2014/0156667 A1* | 6/2014 | Kapadia | G06F 17/30946 707/741 |
| 2014/0169365 A1* | 6/2014 | Sundaram | H04L 45/745 370/357 |
| 2014/0241359 A1* | 8/2014 | Bosshart | H04L 45/74 370/392 |
| 2014/0244815 A1* | 8/2014 | Bhardwaj | H04L 45/745 709/223 |
| 2014/0298039 A1* | 10/2014 | Pandya | G06F 12/1408 713/190 |
| 2014/0310307 A1 | 10/2014 | Levy | |
| 2014/0358886 A1* | 12/2014 | Westlund | G06F 17/30867 707/708 |
| 2014/0369365 A1* | 12/2014 | Denio | H04L 69/16 370/474 |
| 2015/0098470 A1 | 4/2015 | Sun | H04L 45/748 370/392 |
| 2015/0124633 A1 | 5/2015 | Banerjee | |
| 2015/0131665 A1* | 5/2015 | Griswold | H04L 45/745 370/392 |
| 2015/0146539 A1 | 5/2015 | Mehta | H04L 47/125 370/237 |
| 2015/0341307 A1* | 11/2015 | Page | H04L 69/22 370/392 |
| 2016/0112319 A1* | 4/2016 | Hasani | H04L 45/748 370/392 |

(56) References Cited

U.S. PATENT DOCUMENTS

| | | |
|---|---|---|
| 2016/0134536 A1 | 5/2016 | Wang |
| 2016/0134537 A1 | 5/2016 | Huynh |
| 2016/0149856 A1* | 5/2016 | Hui .................... H04L 61/2015 |
| | | 370/252 |
| 2016/0173445 A1 | 6/2016 | Mosko et al. |
| 2016/0182372 A1* | 6/2016 | Holbrook .............. H04L 45/748 |
| | | 370/392 |
| 2016/0234112 A1 | 8/2016 | Anand |
| 2016/0239362 A1 | 8/2016 | Edmiston ............ G06F 11/0721 |
| 2016/0277297 A1* | 9/2016 | Chang .................... H04L 45/54 |

* cited by examiner

COMPRESSED SUBNET TABLE 400

| COMPRESSED SUBNET 402 | SUBNET 404 |
|---|---|
| 1 | SUBNET 1 |
| 2 | SUBNET 2 |
| ... | ... |
| 511 | SUBNET 511 |
| 0 | RESERVED |

FIGURE 4

METHOD AND APPARATUS OF COMPRESSING NETWORK FORWARDING ENTRY INFORMATION

RELATED APPLICATIONS

Applicant claims the benefit of priority of prior, provisional application Ser. No. 62/095,572, filed Dec. 22, 2014, the entirety of which is incorporated by reference.

FIELD OF INVENTION

This invention relates generally to data networking, and more particularly, to compressing network forwarding entry information.

BACKGROUND OF THE INVENTION

A network element with multiple interfaces can forward data from one network to another network by receiving the data, analyzing the data, and deciding which interface to transmit the data. In particular, if the data is stored in a packet, the network element determines the transmission interface by analyzing a destination address stored in the packet header. The network element looks up a match for the destination address in a forwarding table to determine which interface the network element will transmit the packet. The forwarding information is stored in a forwarding table. Each entry in the forwarding table includes an address subnet and an interface, which is a next hop. The subnet is a subdivision of a network and is represented by a range of network addresses, or addresses.

The forwarding table lookup for a destination address can be done in software or hardware. If done in software, the forwarding table is stored in the main memory of the network element and the processing is performed by the main central processing unit of the network element. Performing forwarding table lookup in software, however, is slower than in hardware. For hardware-based lookups, the forwarding table information is stored in special memory that allows a network processor to perform a fast lookup of the forwarding table. For example, the special memory can be content addressable memory (CAM) that allows for a high speed search of the forwarding table. A problem with storing the forwarding table in a CAM is that a CAM is expensive both in terms of cost and power needed to support the CAM. Thus, storing the forwarding table in a CAM limits the size of the forwarding table.

SUMMARY OF THE DESCRIPTION

A method and apparatus of a device that determines a match for a compressed address using an exact match table of a network element is described. In an exemplary embodiment, the network element receives a data packet that has a destination address. The network element further compresses the destination address to give a compressed address. In addition, the network element performs an address lookup using the compressed address in an exact match table. Furthermore, a match in the address lookup indicates a transmitting interface of the network element. The network element forwards the data packet using the transmitting interface.

In another embodiment, the network element receives a data packet that includes a destination address. The network element further compresses the destination address to give a compressed address. In addition, the network element performs an address lookup using the compressed address in an exact match table. Furthermore, a match in the address lookup indicates a first transmitting interface of the network element. The network element additionally performs an address lookup using the destination address with a longest prefix match table, wherein a match in the address lookup indicates a second transmitting interface of the network element. In addition, the network element determines a transmitting interface based on results from the exact match table address lookup and the longest prefix match address lookup. The network element forwards the data packet using the transmitting interface.

Other methods and apparatuses are also described.

BRIEF DESCRIPTION OF THE DRAWINGS

The present invention is illustrated by way of example and not limitation in the figures of the accompanying drawings in which like references indicate similar elements.

FIG. 4 is an illustration of one embodiment of a compressed subnet table.

DETAILED DESCRIPTION

Figure 1:
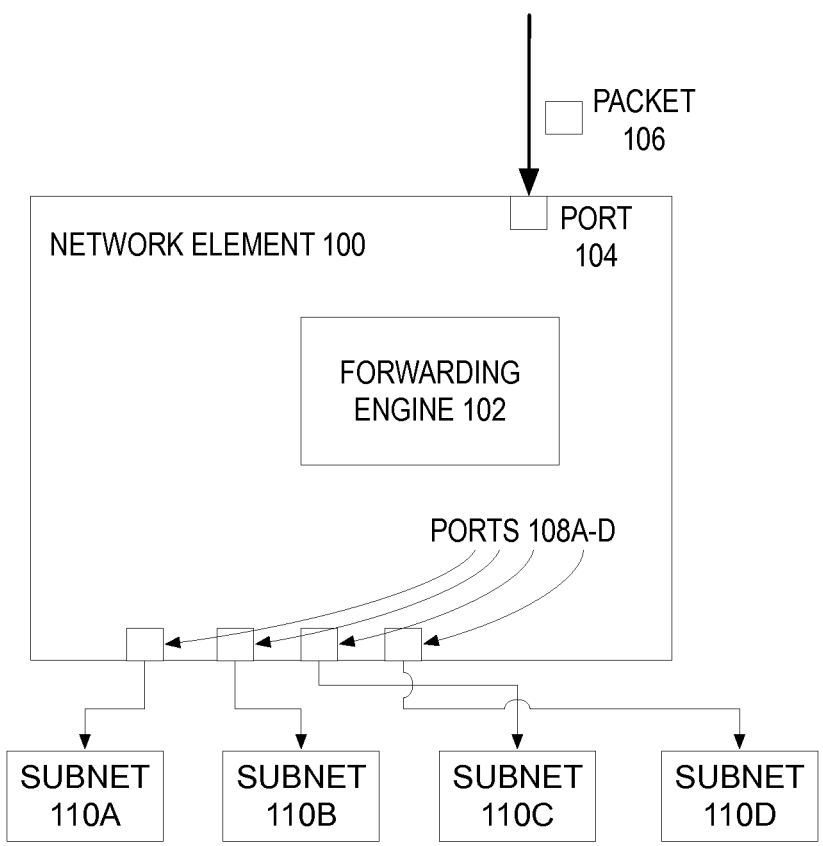
FIG. 1 is a block diagram of one embodiment of a network element that includes a forwarding engine.

A method and apparatus of a device that determines a match for a compressed address using an exact match table of a network element is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that determines a match for a compressed address using an exact match table of the device is described. In one embodiment, the device compresses forwarding entries and/or addresses for forwarding decisions so that the more forwarding entries can be stored in the forwarding table. In this embodiment, the device compresses an address in the forwarding entry, where the forwarding entry includes an address and a next hop interface. In one embodiment, the address is a 128-bit Internet Protocol (IP) v6 that includes a 64-bit subnet and a 64-bit host address. In this embodiment, the device compresses the 64-bit subnet to smaller value (e.g., a 9-bit value, allowing for up to 512 different subnets) and leaves the 64-bit host address is left uncompressed. Thus, the compressed address, in this embodiment, is a 73-bit address (9-bit subnet and with 64-bit host address).

In one embodiment, the device uses the compressed address to update the forwarding table and to make forwarding decisions for a destination address in a packet to be processed. In one embodiment, the forwarding table of the device includes three different tables: an exact match table; a longest prefix match table; and a compressed subnet table. In this embodiment, the exact match table is a table of forwarding entries that is used for an exact match address lookup of the destination address. The exact match address lookup determines a match if the bits of the destination address are matched with an entry in the exact match table. For an exact match address lookup, there is either a single match or no match.

On the other hand, for a longest prefix match address lookup, an address may match many different entries in the longest prefix match table. A longest prefix match address lookup returns the forwarding entry that has the longest prefix match to the address that is used for the lookup. For example and in one embodiment, if one forwarding entry can match 16 bits of an address and another forwarding entry matches 24 bits of an address, the second forwarding entry is used for the longest prefix match.

The third table in the forwarding table is the compressed subnet table. This table is used to determine if the subnet of a destination address would be represented in the exact match table and also to compress the subnet of the destination address. In one embodiment, the device compresses the subnet address by computing an n-bit hash of the subnet and comparing the n-bit hash with the entries in the compressed subnet table.

In one embodiment, the device updates the forwarding table by inserting new forwarding entries in the exact match. In this embodiment, the device compresses the address in the new forwarding entry by compressing the subnet portion of the address. If there is room for the entry, the device stores the forwarding entry in the exact match table.

In another embodiment, the device makes a forwarding decision by receiving a packet that includes a destination address. The device compresses the destination address and uses the compressed address to perform an exact match address lookup. In another embodiment, the device can also perform a longest prefix match addressed lookup using the uncompressed destination concurrently with the exact match address lookup using the compressed address. In this embodiment, the device may get a result from the exact match address lookup, the longest prefix match, or both. In one embodiment, if the device receives a result from the exact match address lookup, the device uses this result for the forwarding decision of the packet. If there is both exact match address lookup and a longest prefix match address lookup result, the device will use the exact match address lookup result. If there is no exact match address lookup result and there is a longest prefix match address lookup result, the device uses the longest prefix match address lookup result for the forwarding decision of the packet. The device uses this selected result to make a forwarding decision. In another embodiment, an address that is part of an Access Control List (ACL) can be compressed as described above. In this embodiment, an address that is not too wide and stored in an ACL table can be compressed as described above. For example and in one embodiment, a ternary CAM (TCAM) used to store an ACL table can be configurable in different widths (e.g., 80, 160, 320, 640 bits wide). In this example, the compressed address can be compressed to a narrower width (e.g., 160 bits or less).

FIG. 1 is a block diagram of one embodiment of a network element 100 that includes a forwarding engine 102. In FIG. 1, the network element 100 includes a forwarding engine 102 that forwards a received packet 106 on port 104 out one of the ports 108A-D based on the destination address in the packet 106. In one embodiment, the network element receives the packet 106 on the receiving port 104 and analyzes the packet 106 based on the destination address in the packet 106 to determine which port 108A-D to transmit the packet 106. In this embodiment, each of the possible transmitting ports 108A-D is coupled to a corresponding subnet 110A-D, which can be a destination subnet for the incoming packet 106. The forwarding engine 102 includes a forwarding table (described further below) that the forwarding engine 102 uses to determine which ports 108A-D to transmit the packet 106. In one embodiment, the forwarding engine 102 performs an address lookup using the forwarding table for the packet destination address to determine a next hop for the packet.

In one embodiment, the forwarding table can include forwarding information. For example and in one embodiment, the routing table stores running table entries for the one or more routing protocols that is used by the hardware forwarding engine, by using any of the running protocols known in the art such as routing information protocol (RIP), border gateway protocol (BGP), open shortest path first (OSPF), intermediate system-intermediate system (IS-IS), interior gateway routing protocol (IGRP), enhanced IGRP (EIGRP), protocol independent multicast (PIM), distance vector multicast routing protocol (DVMRP), and any/or other type or unicast or multicast routing protocol known in the art. In another embodiment, the forwarding table can store routing information for Internet Protocol (IP) v4 and IPv6 addresses.

As described above, the forwarding table can be stored in software (e.g., the network element's main memory) or can be stored in hardware (e.g., specialized fast-performing memory such as content addressable memory (CAM)). In one embodiment, the exact match table can be stored in a hash table and the longest prefix match table can be stored in a TCAM, trie, and/or a combination of a TCAM and other types of memory (static random access memory (SRAM)). Storing the forwarding table in software leads to poor performance. Hardware storage of the forwarding table leads to better performance but the specialized memory is expensive both in terms of cost and the power requirement. Thus, the network element 100 will tend to use a smaller amount of the specialized memory.

By using a smaller memory, the number of entries in the forwarding table can be restricted. In one embodiment, each forwarding table entry includes an address or address range (e.g., a subnet) and a next hop. In one embodiment, the next hop is an interface that is used by the network element 100 to transmit a packet with an address that matches this forwarding entry. The size of the forwarding table in hardware is further compounded if the forwarding addressing information increases. For example and in one embodiment, IPv4 addresses are each 32 bits, whereas IPv6 addresses are four times this size at 128 bits. Thus, storing forwarding information for IPv6 addresses using the same sized hardware resources means that the size of this forwarding table is a smaller, because the forwarding tables has a smaller number of entries.

In one embodiment, the network element 100 compresses the address so that a forwarding entry that share a common set of subnets takes up less space. In this embodiment, the network element 100 stores compressed addresses in the forwarding table and performs address lookups using a compressed address. For example and in one embodiment, the network element 100 creates and maintains a forwarding table using compressed addresses. In this example, as the network element receives new or updated forwarding table entries, the network element compresses the address information and stores this compressed address information in the forwarding table. In addition, for each packet the network element receives needing forwarding decisions, the network element compresses the destination address stored in the packet and uses this compressed address to perform address lookup in the forwarding table.

Figure 2:
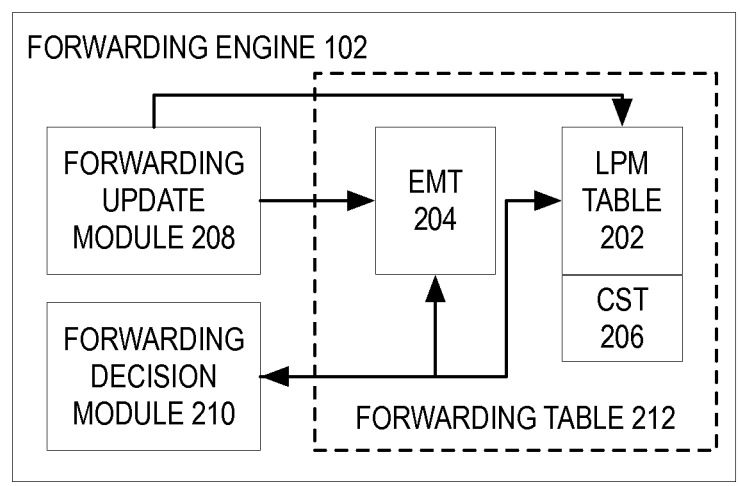
FIG. 2 is a block diagram of one embodiment of a forwarding engine that includes a longest prefix table and an exact match table.

FIG. 2 is a block diagram of one embodiment of a forwarding engine 102 that includes a longest prefix table 202 and an exact match table 204. In FIG. 2, the forwarding engine 102 includes a forwarding table 212, a forwarding update module 208, and a forwarding decision module 210. In one embodiment, the forwarding table 212 includes multiple tables of forwarding information that is used make forwarding decisions. In this embodiment, the forwarding table 212 includes an exact match table (EMT) 204, a longest prefix match (LPM) table 202, and a compressed subnet table 206. In one embodiment, the EMT 204 is a hash table that is used for exact match address lookup to determine a next hop for a packet. Alternatively, the EMT 204 can be a different type of table. In this embodiment, an exact match means that an address lookup will have a match for an address if that address is in the table. This is in contrast to a longest prefix match, which matches based on parts of an address. In one embodiment, the EMT 204 is stored in a hash table. For example and in one embodiment, the EMT 204 is stored in memory that is four to eight times cheaper than a TCAM.

In one embodiment, the forwarding engine compresses IPv6 addresses and processes IPv4 address normally (e.g., not compressing them). In this embodiment, the larger 128-bit IPv6 address or routes are compressed, stored, and processed, whereas other type of addresses (e.g., IPv4 are processed without address compression. In one embodiment, the 128-bit address IPv6 address includes an upper 64-bit block for a subnet and a lower 64-bit block for host address. In this embodiment, the forwarding engine 102 can compress the upper 64-bit subnet to a value that is less than 64 bits. For example and in one embodiment, the forwarding engine 102 compresses the upper 64-bit subnet to a 9-bit value. In this example, compressing the 64-bit subnet to a 9-bit value allows for 511 different subnets to be stored or processed using the forwarding table, one value is reserved to mean that the subnet did not match a compressed subnet. In this embodiment, the compressed address would then have a 9-bit subnet and a 64-bit host. In another embodiment, the 64-bit subnet address can be compressed to a different value (e.g., 10-bit, 11-bit, 12-bits, or another size that is greater or smaller than 9-bits). The choice in the size of the compressed subnet value can depend on the number of compressed routes that are to be stored in the EMT 204. This type of compressed address is useful when the type of traffic being processed by the network is from a small number of different subnets (e.g. for a compressed address with a 9-bit subnet, traffic is being handled by less than 511 different subnets). This address would be stored as part of a forwarding entry in the forwarding table, as described in FIG. 5. In one embodiment, the forwarding update module 208 updates the EMT 204 using compressed addresses. In another embodiment, the compressed address would be used for an address lookup, as described in FIGS. 3 and 6 below. In one embodiment, the compressed subnet address is an n-bit hash computed by the forwarding engine 102. By storing the forwarding entries in the EMT 204, up to 768K entries can be stored instead of 6K uncompressed entries stored in the LPM 202.

In one embodiment, the EMT 204 stores compressed addresses for exact match address lookups. In this embodiment, the forwarding engine (e.g., forwarding engine 102) stores a forwarding entry that includes the compressed address and an interface in the forwarding table 212. In addition, the forwarding engine 102 can perform address lookups using the compressed address with the EMT 204. The forwarding engine 102 further stores the association between the 64-bit subnet and the 9-bit compressed value in compressed subnet table 206. In one embodiment, the compressed subnet table 206 is stored in a TCAM. In this embodiment, storing the compressed subnet table in a TCAM (or TCAM bank) allows for quick searching of the compressed subnet table 206 as some or all of the stored subnets are searched concurrently. For example and in one embodiment, the forwarding engine 102 searches for compressed subnets by computing an n-bit hash (e.g., 9-bit hash) In one embodiment, the compressed subnet table 206 is stored in a TCAM. In this embodiment, by storing the compressed subnet table 206 in the TCAM, the forwarding engine 102 can search some or all of the entries in the in the compressed subnet table 206 concurrently. This gives a quick search for the subnet for each destination address that is processed.

As described above, the forwarding engine 102 also includes a longest prefix match table, LPM table 202. In one embodiment, the LPM table 202 is used to store forwarding entries for a longest prefix match type of address lookup. In this embodiment, a longest prefix match address lookup may match multiple entries in the LPM table 202. A longest prefix match address lookup returns the entry that has the longest prefix match to the address that is used for the lookup. For example and in one embodiment, if one forwarding entry can match 16 bits of an address and another forwarding entry matches 24 bits of an address, the second forwarding entry is used for the longest prefix match. In one embodiment, the LPM table 202 is stored in a TCAM, so that some or all on the entries in the LPM table can be searched concurrently. In one embodiment, the forwarding engine 102 uses uncompressed addresses for the address lookup with the LPM table 202.

As described above, the forwarding engine 102 can use two different types of address lookups: an exact match address lookup using a compressed address with the EMT 204 and a longest prefix match address lookup using an uncompressed address with the LPM table 202. In one embodiment, the forwarding engine 102 can perform both address lookups for each address concurrently. As will be described below, the forwarding engine 102 determines a next hop for a destination address by performing an exact match address lookup using a compress destination address and also performing a longest prefix match address lookup with the uncompressed destination address. In this embodiment, the forwarding engine 102 takes the results of the two address lookups and decides which result to use for the next hop decision. In one embodiment, the forwarding decision module 210 performs one or both of the address lookups to determine a next hop for the destination address. In one embodiment, the forwarding engine 102 performs the two address lookups concurrently by overlapping the time periods in which the two address lookups are performed.

Figure 3:
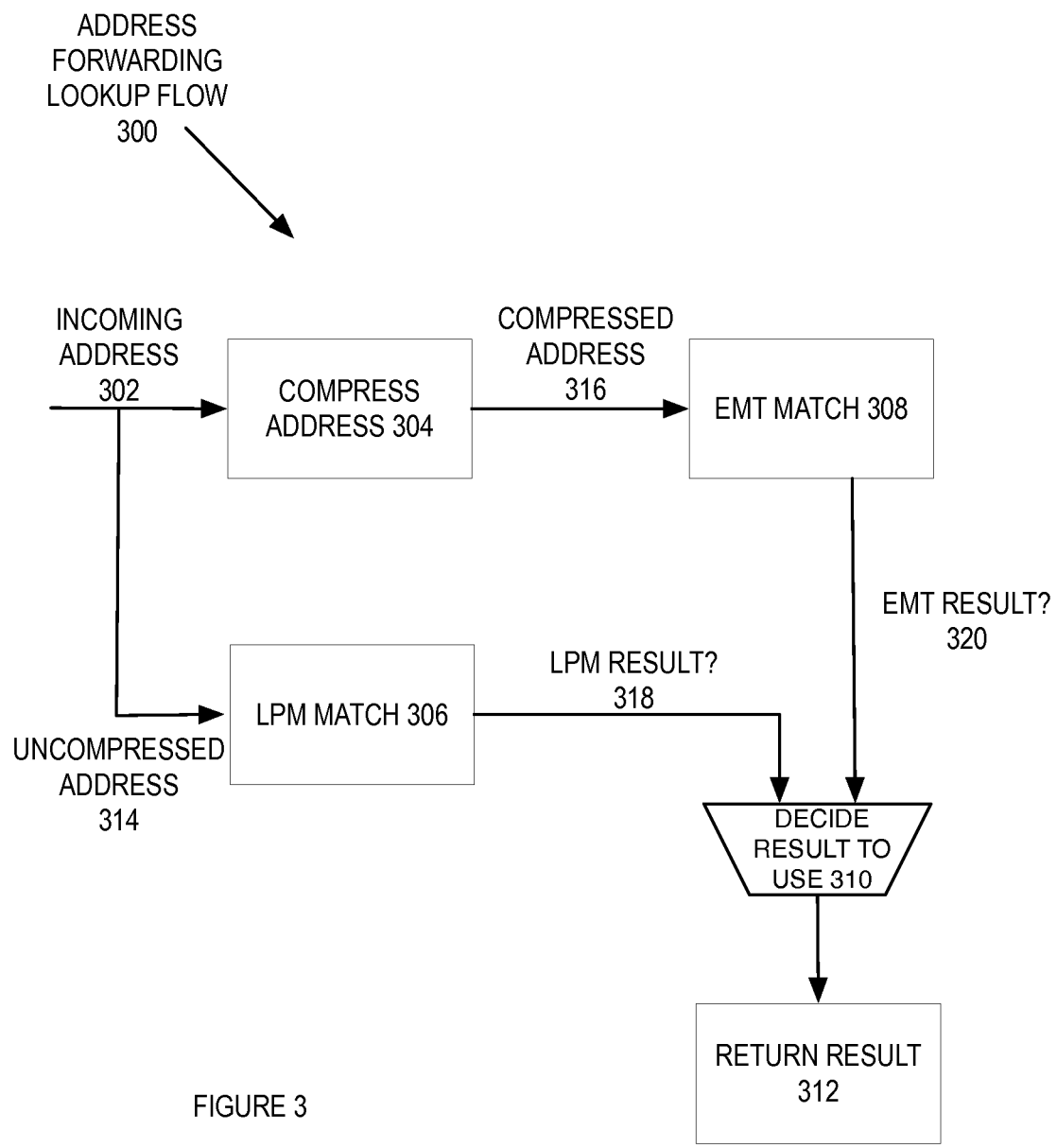
FIG. 3 is a block diagram of one embodiment of an address forwarding lookup flow.

FIG. 3 is a block diagram of one embodiment of an address forwarding lookup flow 300. In FIG. 3, the flow 300 begins with an incoming address (302). In one embodiment, the incoming address (302) is sent to be compressed (304) for an EMT lookup (308) and also for an uncompressed LPM lookup (306). The EMT lookup result (320) and LPM lookup result (318) is send to a decider (310) that decides which result to use. In one embodiment, the decider (310) will use LPM result (318) if the LPM result (318) is the only valid result, use the EMT result (320) if the EMT result (320) is the only valid result, or use the EMT result (320) if there is both a valid EMT and LPM result. The result is returned (312). The flow is further described in FIG. 6 below.

As described above, the EMT 204 uses a compressed subnet table 206 to store the association between the compressed subnet and the uncompressed subnet. FIG. 4 is an illustration of one embodiment of a compressed subnet table 400. In FIG. 4, the compressed subnet table 400 in the compressed subnets 402 and the subnets 404. In one embodiment, the compressed subnet table 400 includes 512 entries because the compressed subnets are 9-bits. In one embodiment, the entry for the zero value is reserved to indicate that there was not a match in the subnet compression. This is required because the lower address could be the same for some compressed addresses and some not compressed so to distinguish a compressed and uncompressed subnet one index is reserved. In another embodiment, the size of the compressed subnet table 206 can be larger or smaller, depending on the size of the compressed subnets. For example and in one embodiment, if the compressed subnet is 8 bits, the size of the compressed subnet table is 256. Alternatively, if the compressed subnet is 10 bits, the size of the compressed subnet table is 1024.

In one embodiment, compressing the subnet address can be done because the variation of subnet values that are processed by the network element is relatively small. In this embodiment, over a period of time, the variation of uncompressed subnet values may be less than the size of the compressed subnet table 206. On the other hand, the variation of the host addresses can vary greatly.

Figure 5:
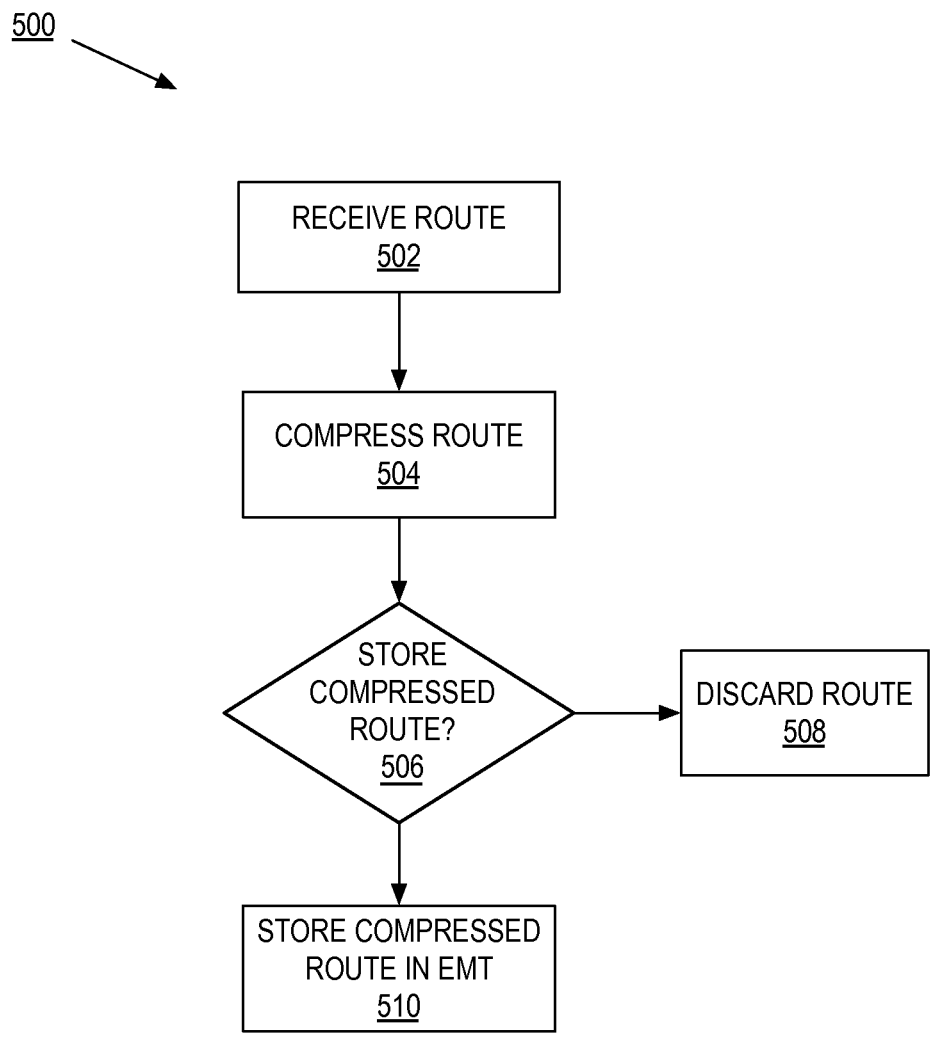
FIG. 5 is a flow diagram of one embodiment of a process to store a compressed route in an exact match table.

The EMT 204 stores compressed addresses that are used for exact match address lookup. In order to be used for exact match address lookup, the EMT 204 needs to be populated. In one embodiment, the EMT 204 is populated from via user configuration, route announcements received form one or more different routing protocols, route statistics, first come-first serve, historical use with hysteresis to prevent churning, or another way to introduce/update routes into a forwarding table. FIG. 5 is a flow diagram of one embodiment of a process to store a compressed route in an exact match table. In one embodiment, a forwarding update module performs process 500 to store a compressed route in an exact match table, such as the forwarding update module 208 as described in FIG. 2 above. In FIG. 5, process 500 begins by receiving a route to be stored in a forwarding table at block 502. In one embodiment, process 500 receives the route from user configuration, route announcements received form one or more different routing protocols, route statistics, first come-first serve, historical use with hysteresis to prevent churning, or another way to introduce/update routes into a forwarding table. In one embodiment, the route includes an address and a next hop interface. At block 504, process 500 compresses the route. In one embodiment, process 500 compresses the route by compressing the address that is included in the route. For example and in one embodiment, the address is an IPv6 address and process 500 compresses the address by compressing the upper 64-bits of the IPv6 address by computing a n-bit hash (e.g., 9-bits) as described in FIG. 2 above. In one embodiment, the compressed route includes the compressed address and the next hop interface.

At block 506, process 500 determines if the compressed route can be stored in the exact match table. In one embodiment, process 500 performs a lookup of compressed route address in the compressed subnet table, such as the compressed subnet table 206 as described in FIG. 2 above. For example and in one embodiment, the compressed subnet table 206 is stored in a TCAM memory, process 500 searches the compressed subnet table 206 at once using the TCAM hardware.

If the compressed route is not stored in the compressed subnet table, in one embodiment, process 500 determines that there is not a match in the exact match table. Alternatively, if there is available storage in the compressed subnet table, process 500 can add the new compressed subnet to the compressed subnet table. In addition at block 506, if the compressed route is in the compressed subnet table (or is added), process 500 determines if the compressed route can be stored in the exact match table. In one embodiment, the compressed route can be stored in the exact match table if there is room available to store the compressed route. If there is no room available for the compressed route, process 500 can reject storage of the compressed route or replace an existing route. If process 500 replaces an existing route, process 500 can select an existing route to be replaced using in different ways (e.g., least used route, oldest route, or another way to replace a route in a forwarding table). If the compressed route cannot be stored, at block 508, process 500 discards the route. If the route can be stored, process 500 stores the compressed route in the exact match table at block 510.

Figure 6:
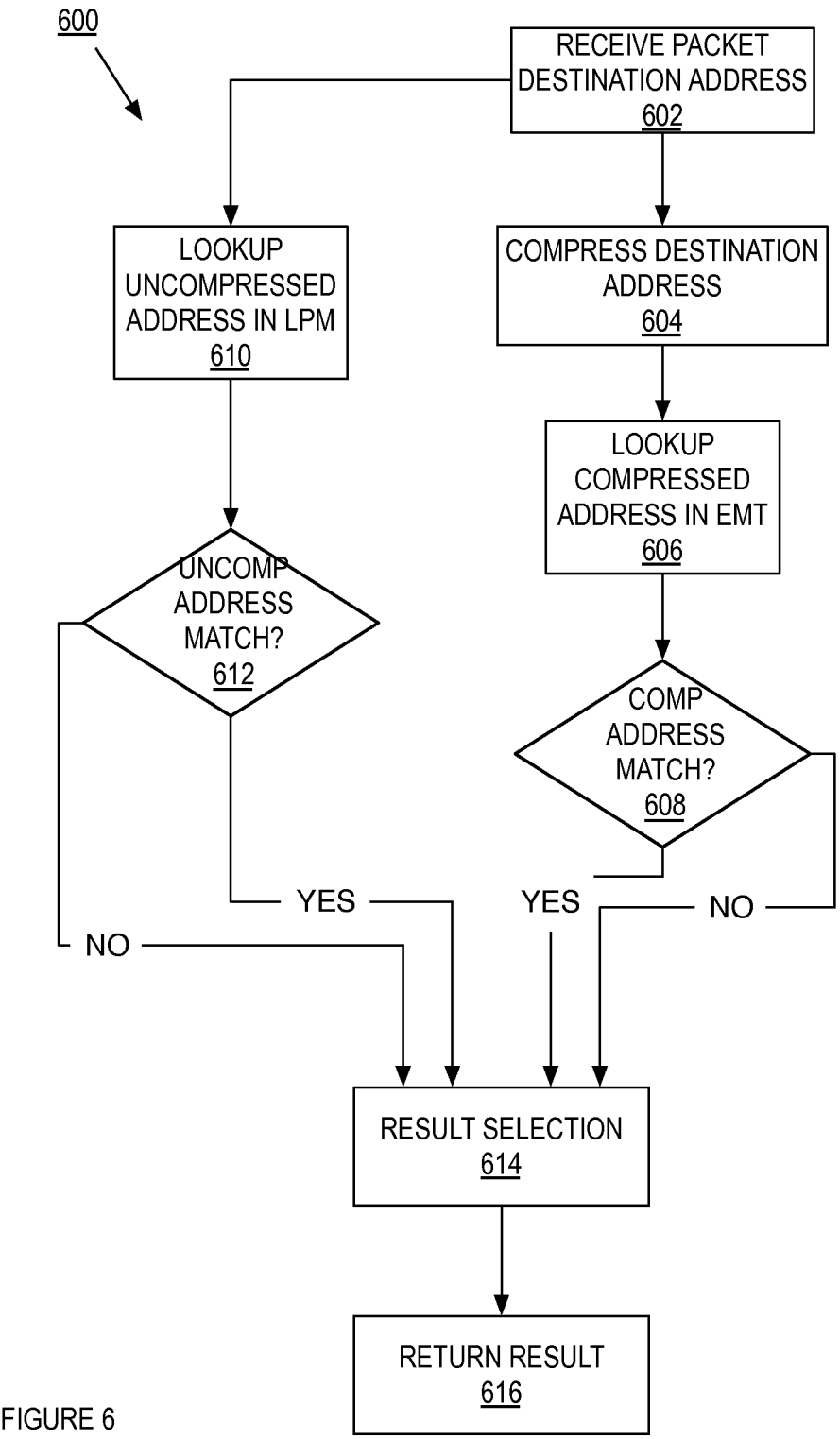
FIG. 6 is a flow diagram of one embodiment of a process to process an address using an exact match table.

FIG. 6 is a flow diagram of one embodiment of a process 600 to process an address using an exact match table. In one embodiment, a forwarding decision module performs process 500 to process an address using an exact match table, such as the forwarding decision module 210 as described in FIG. 2 above. In FIG. 6, process 600 receives a packet destination address at block 602. In one embodiment, the packet destination address is the destination address stored in a packet to be processed by the network element. In one embodiment, process 600 can process the packet destination address in different mode. In one more, process 600 can process the packet destination address as a compressed address (blocks 604-608) using the exact match table, as an uncompressed address (blocks 610-612) using the longest prefix table, or in parallel using both the exact match table (blocks 604-608) and longest prefix table (blocks 610-612).

In one embodiment, process 600 compresses the destination address at block 604. In one embodiment, the address is an IPv6 address and process 600 compresses the address by compressing the upper 64-bits of the IPv6 address to a smaller value (e.g., 9-bits) as described in FIG. 2 above. At block 606, process 600 performs an address lookup using an exact match table using the compressed address. In one embodiment, process 600 computes a hash of the compressed and uses the computed hash to lookup up the address in the exact match table. Process 600 determines if there is an exact match table match at block 608. If there is a match, process 600 stores the next hop from the matching forwarding entry as the result of the exact match table lookup. If there is no match, process 600 stores a negative indication as the result of the exact match table lookup.

If process 600 is performing an uncompressed lookup using the longest prefix match, process 600 performs the longest prefix match address lookup using an uncompressed destination address at block 610. In one embodiment, A longest prefix match address lookup returns the entry that has the longest prefix match to the address that is used for the lookup as described in FIG. 2 above. At block 612, process 600 determines if there is a match from the longest prefix match address lookup. If there is a match, process 600 stores the next hop from the matching forwarding entry as the result of the longest prefix match table lookup. If there is no match, process 600 stores a negative indication as the result of the longest prefix match table lookup.

At block 614, process 600 selects the results from the address lookup(s). If there is a result from the exact match table lookup or if there is a result from both the exact match and the longest prefix match lookups, process 600 selects the result from the exact match lookup. In one embodiment, the exact match result is preferred because this is the longest prefix match possible as the /128 prefix is stored in the exact match table. For example and in one embodiment, the address maybe stored in a forwarding entry in the exact match table may be different than a match from a longest prefix match. In this example, an exact match address lookup may return that the next hop for an address is if1, while the longest prefix match may return a default route that has a next hop for if2. With the two results, since there is an exact match of the destination address, the exact match result is preferred instead of the default route result of the longest prefix match. If there is a longest prefix result, but no exact match entry, process 600 returns the result from the longest prefix match. At block 616, process 600 returns the selected result. In one embodiment, the network element uses the result to determine the next hop for the packet with the destination address. In this embodiment, the network element transmits the packet using the interface in the result.

Figure 7:
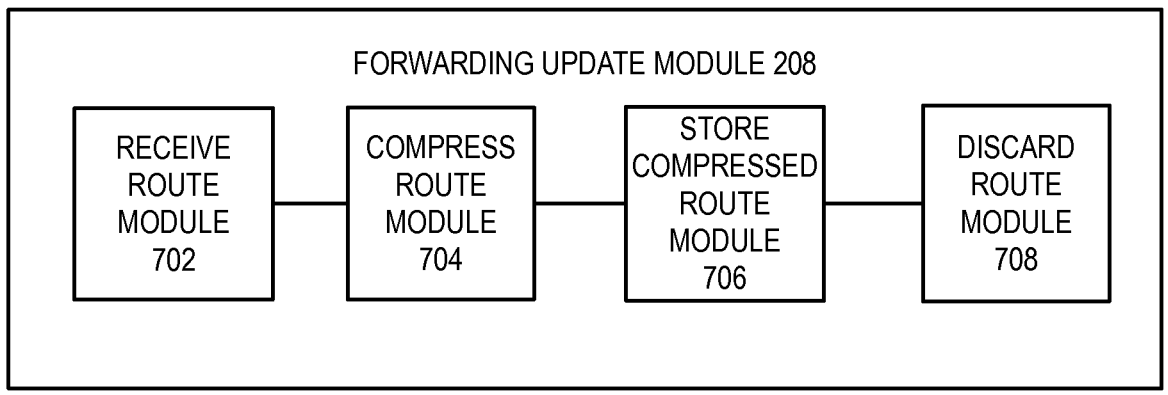
FIG. 7 is a block diagram of one embodiment of a forwarding update module that stores a compressed route in an exact match table.

FIG. 7 is a block diagram of one embodiment of a forwarding update module 208 that stores a compressed route in an exact match table. In FIG. 7, the forwarding update module 208 includes a receive route module 702, compress route module 704, store compressed route module 706, and discard route module 708. In one embodiment, the receive route module 702 receives the route as described in FIG. 5, block 502 above. The compress route module 704 compresses the route as described in FIG. 5, block 504 above. The store compressed route module 706 stores the compressed route as described in FIG. 5, block 510 above. The discard route module 708 discards the route as described in FIG. 5, block 508 above.

Figure 8:
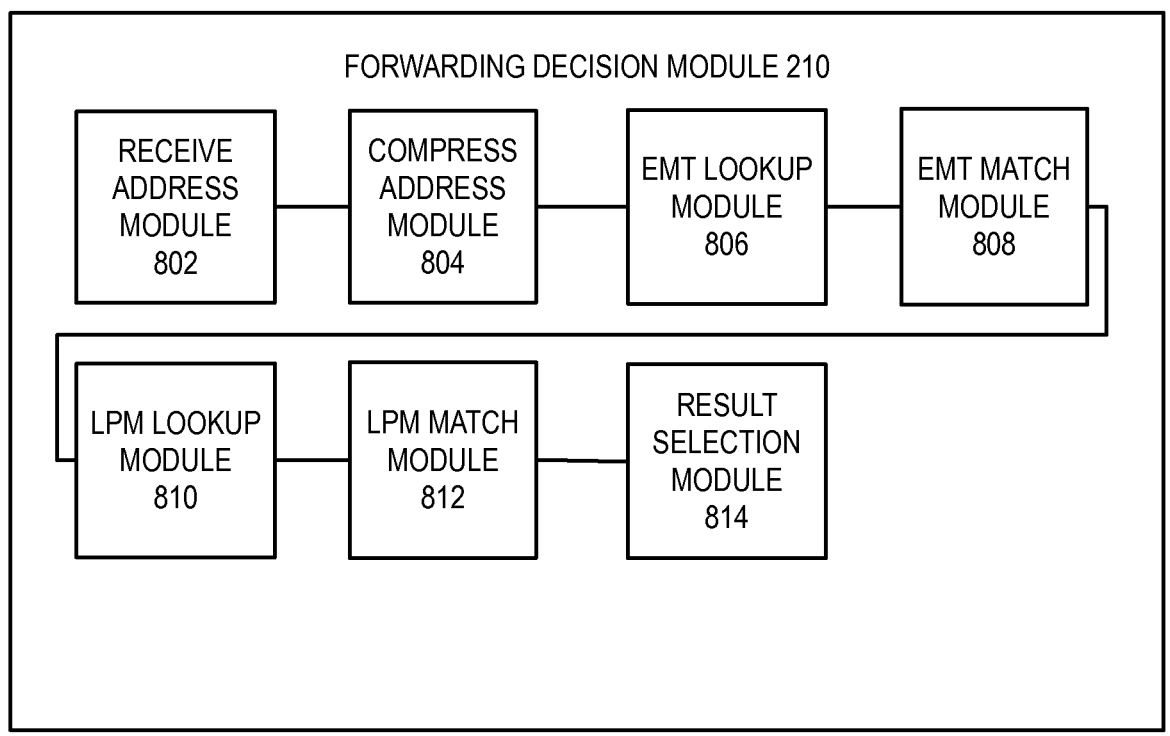
FIG. 8 is a block diagram of one embodiment of a forwarding decision module that processes an address using an exact match table.

FIG. 8 is a block diagram of one embodiment of a forwarding decision module 210 that processes an address using an exact match table. In one embodiment, the forwarding decision module 210 includes a received address module 802, compress address module 804, exact match table lookup module 806, exact match table match module 808, longest prefix match lookup module 810, longest prefix match module 812, and result selection module 814. In one embodiment, the received address module 802 receives the destination address as described in FIG. 6, block 602. The compress address module 804 compresses the address as described in FIG. 6, block 604. The exact match table lookup module 806 performs the exact match address lookup as described in FIG. 6, block 606. The exact match table match module 808 determines if there is a match as described in FIG. 6, block 608. The longest prefix match lookup module 810 performs a longest prefix match lookup as described in FIG. 6, block 610. The longest prefix match module 812 determines if there is a result form the longest prefix match lookup as described in FIG. 6, block 612. The result selection module 814 selects the result to return as described in FIG. 6, block 614.

Figure 9:
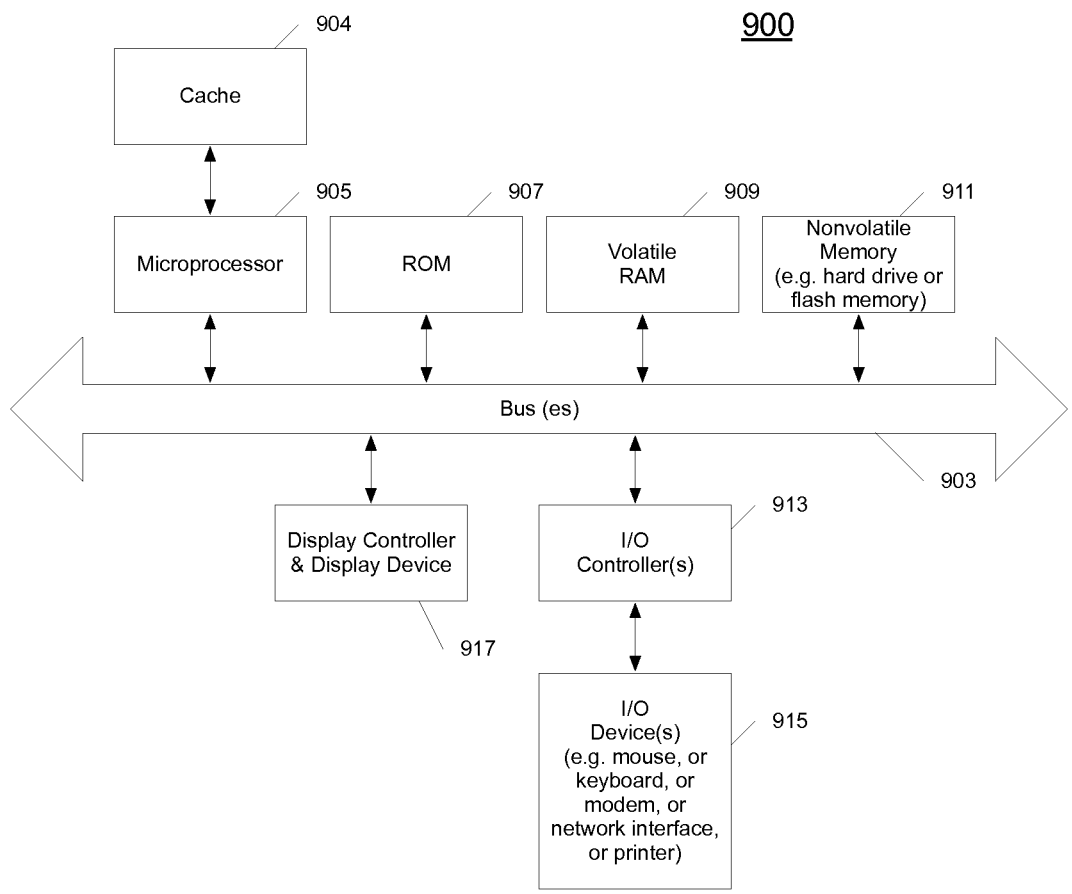
FIG. 9 illustrates one example of a typical computer system, which may be used in conjunction with the embodiments described herein.

FIG. 9 shows one example of a data processing system 900, which may be used with one embodiment of the present invention. For example, the system 900 may be implemented including a network element 100 as shown in FIG. 1. Note that while FIG. 9 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 9, the computer system 900, which is a form of a data processing system, includes a bus 903 which is coupled to a microprocessor(s) 905 and a ROM (Read Only Memory) 907 and volatile RAM 909 and a non-volatile memory 911. The microprocessor 905 may retrieve the instructions from the memories 907, 909, 911 and execute the instructions to perform operations described above. The bus 903 interconnects these various components together and also interconnects these components 905, 907, 909, and 911 to a display controller and display device 917 and to peripheral devices such as input/output (I/O) devices which may be mice, keyboards, modems, network interfaces, printers and other devices which are well known in the art. In one embodiment, the system 900 includes a plurality of network interfaces of the same or different type (e.g., Ethernet copper interface, Ethernet fiber interfaces, wireless, and/or other types of network interfaces). In this embodiment, the system 900 can include a forwarding engine to forward network date received on one interface out another interface.

Typically, the input/output devices 915 are coupled to the system through input/output controllers 913. The volatile RAM (Random Access Memory) 909 is typically implemented as dynamic RAM (DRAM), which requires power continually in order to refresh or maintain the data in the memory.

The mass storage 911 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 911 will also be a random access memory although this is not required. While FIG. 9 shows that the mass storage 911 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 903 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 10:
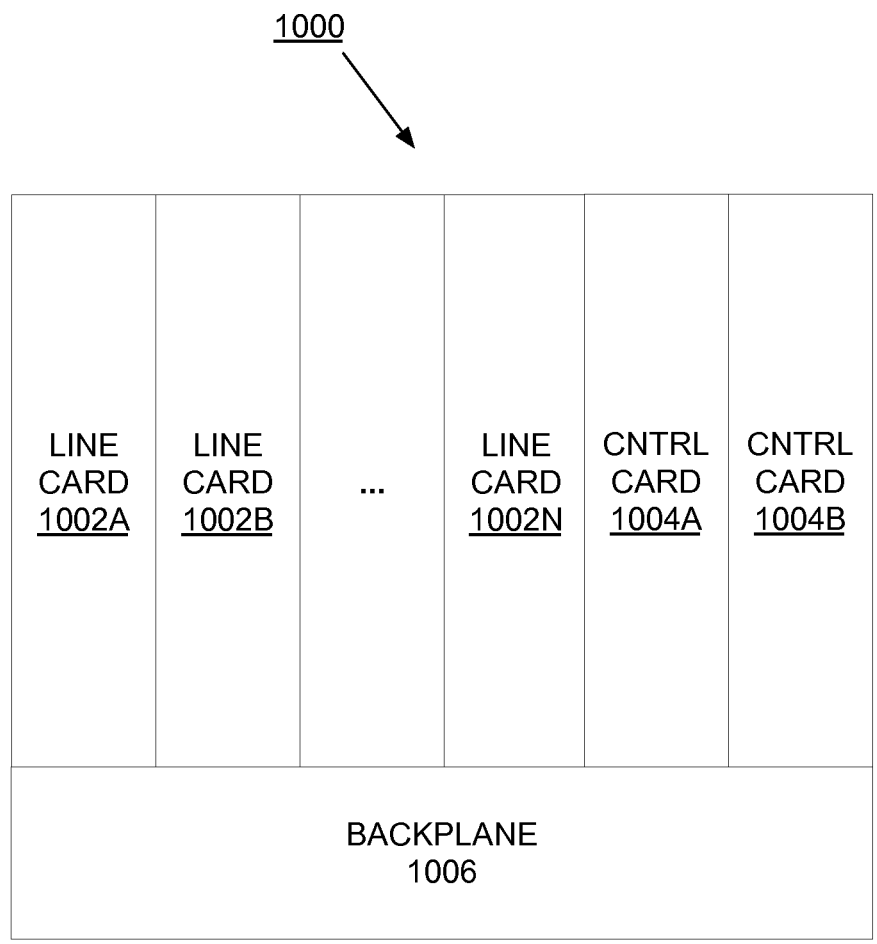
FIG. 10 is a block diagram of one embodiment of an exemplary network element that determines a match for a compressed address using an exact match table of a network element.

FIG. 10 is a block diagram of one embodiment of an exemplary network element 1000 that determines a match for a compressed address using an exact match table of a network element. In FIG. 10, the backplane 1006 couples to the line cards 1002A-N and controller cards 1004A-B. While in one embodiment, the controller cards 1004A-B control the processing of the traffic by the line cards 1002A-N, in alternate embodiments, the controller cards 1004A-B, perform the same and/or different functions (e.g., determining a match for a compressed address using an exact match table of a network element, etc.). In one embodiment, the line cards 1002A-N process and forward traffic according to the network policies received from controller cards the 1004A-B. In one embodiment, one of the line cards 1002A-N determines a match for a compressed address using an exact match table of a network element as described in FIGS. 2-6. In this embodiment, one, some, or all of the line cards 1002A-N includes the forwarding engine to determine a match for a compressed address using an exact match table of a network element in this network element 1000, such as the forwarding engine 102 as described in FIG. 2 above. It should be understood that the architecture of the network element 1000 illustrated in FIG. 10 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "compressing," "determining," "performing," "forwarding," "storing," "identifying," "updating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to determine a match for a compressed address using an exact match table, the method comprising:
   receiving, with a network element, a data packet that includes a destination address; in response to determining that the data packet is of a first type of a plurality of types:
   compressing the destination address to give a compressed address, wherein the compressed address includes a compressed subnet and an uncompressed host address, and the compressed subnet is compressed using a hash function;
   performing an address lookup using the compressed address in an exact match table concurrently with a longest prefix match address lookup using the uncompressed host address, wherein the exact match table is a hash table that stores a plurality of compressed address with each of the plurality of compressed addresses stored including a compressed subnet and an uncompressed host address, and a transmitting interface of the network element is derived from a match in the address lookup;
   forwarding the data packet using the transmitting interface if there is a match; and in response to determining that the data packet is of a second type of the plurality of types, forwarding the data packet using a transmitting interface derived without compressing the destination address.

2. The non-transitory machine-readable medium of claim 1, wherein the destination address is an Internet Protocol (IP) v6 address.

3. The non-transitory machine-readable medium of claim 1, further comprising:
   receiving a route;
   compressing the route; and
   storing the compressed route in the exact match table.

4. The non-transitory machine-readable medium of claim 3, wherein the route is an Internet Protocol (IP) v6 address.

5. A non-transitory machine-readable medium having executable instructions to cause one or more processing units to perform a method to determine a match for a compressed address using an exact match table, the method comprising:
   receiving a data packet that includes a destination address;
   in response to determining that the data packet is of a first type of a plurality of types:
   compressing the destination address to give the compressed address;
   performing an address lookup using the compressed address with an exact match table that returns a match in the exact match table, wherein a first transmitting interface of the network element is derived from this exact match table match;
   performing an address lookup using the destination address with a longest prefix match table that matches on part of the destination address and returns a match in the longest prefix table, wherein a second transmitting interface of the network element is derived from longest prefix match table match, wherein the second transmitting interface is different from the first transmitting interface, and wherein the longest prefix match address lookup is performed concurrent with the exact match table address lookup;
   selecting between one of the first transmitting interface and the second transmitting interface as a transmitting interface based on results from the exact match table address lookup and the longest prefix match address lookup;
   forwarding the data packet using the transmitting interface; and
   in response to determining that the data packet is of a second type of the plurality of types, forwarding the data packet using a transmitting interface derived without compressing the destination address.

6. A non-transitory machine-readable medium having executable instructions to cause one or more processing units to perform a method to forward a data packet, the method comprising:
   receiving a data packet that includes a destination address;
   determining a type of the data packet;
   if the data packet is of a first type,
   compressing the destination address to give a compressed address, wherein the compressed address includes a compressed subnet and an uncompressed host address,
   performing a first address lookup using the compressed address in an exact match table, wherein the exact match table stores a plurality of compressed address with each of the plurality of compressed addresses stored including a compressed subnet and an uncompressed host address, and a first transmitting interface of the network element is derived from a match in the first address lookup, and
   performing a second address lookup using the destination address in a first longest prefix match table corresponding to the first type data packet, wherein a second transmitting interface of the network element is derived from a match in the second address lookup, and wherein the longest prefix match address lookup is performed concurrent with the exact match table address lookup, and
   selecting one of the first and second transmitting interfaces as a selected transmitting interface;
   if the data packet is of a second type,
   performing a third address lookup using the destination address using a longest prefix match table corresponding to a second type data packet, wherein a selected transmitting interface of the network element is derived from a match in the third address lookup and without compressing the destination address; and forwarding the data packet using the selected transmitting interface.

7. The non-transitory machine-readable medium of claim 6, wherein the first type packet is an Internet Protocol (IP) v6 packet and the second type packet is an IPv4 packet.

8. A method to determine a match for a compressed address using an exact match table, the method comprising:
receiving, with a network element, a data packet that includes a destination address; in response to determining that the data packet is of a first type of a plurality of types:
compressing the destination address to give a compressed address, wherein the compressed address includes a compressed subnet and an uncompressed host address, and the compressed subnet is compressed using a hash function;
performing an address lookup using the compressed address in an exact match table concurrently with a longest prefix match address lookup using the uncompressed host address, wherein the exact match table is a hash table that stores a plurality of compressed address with each of the plurality of compressed addresses stored including a compressed subnet and an uncompressed host address, and a transmitting interface of the network element is derived from a match in the address lookup;
forwarding the data packet using the transmitting interface if there is a match; and in response to determining that the data packet is of a second type of the plurality of types, forwarding the data packet using a transmitting interface derived without compressing the destination address.

9. The method of claim 8, wherein the destination address is an Internet Protocol (IP) v6 address.

10. The method of claim 8, further comprising:
receiving a route;
compressing the route; and
storing the compressed route in the exact match table.

11. The method of claim 10, wherein the route is an Internet Protocol (IP) v6 address.

12. A method to determine a match for a compressed address using an exact match table, the method comprising:
receiving a data packet that includes a destination address;
in response to determining that the data packet is of a first type of a plurality of types:
compressing the destination address to give the compressed address;
performing an address lookup using the compressed address with an exact match table that returns a match in the exact match table, wherein a first transmitting interface of the network element is derived from this exact match table match;

performing an address lookup using the destination address with a longest prefix match table that matches on part of the destination address and returns a match in the longest prefix table, wherein a second transmitting interface of the network element is derived from this longest prefix match table match, and wherein the longest prefix match address lookup is performed concurrent with the exact match table address lookup;
selecting between one of the first transmitting interface and the second transmitting interface as a transmitting interface based on results from the exact match table address lookup and the longest prefix match address lookup, wherein the second transmitting interface is different from the first transmitting interface;
forwarding the data packet using the transmitting interface; and
in response to determining that the data packet is of a second type of the plurality of types, forwarding the data packet using a transmitting interface derived without compressing the destination address.

13. A network element that determines a match for a compressed address using an exact match table, the network element comprising:
a receiving network physical interface coupled to a network, that receives a data packet including a destination address;
memory storing a set of instructions, coupled to the receiving network physical interface, wherein in response to determining that the data packet is of a first type of a plurality of types, the set of instructions compresses the destination address to give a compressed address and performs an address lookup using the compressed address in an exact match table concurrently with a longest prefix match address lookup using the uncompressed host address, wherein the compressed address includes a compressed subnet and an uncompressed host address, and the compressed subnet is compressed using a hash function, the exact match table is a hash table that stores a plurality of compressed address with each of the plurality of compressed addresses stored including a compressed subnet and an uncompressed host address, and a transmitting interface of the network element is derived from a match in the address lookup;
the transmitting network physical interface, coupled to the memory and the network, that forwards the data packet using the transmitting interface if there is a match; and
in response to determining that the data packet is of a first type of a plurality of types, the set of instructions, in response to determining that the data packet is of a second type of the plurality of types, forwards the data packet using a transmitting interface derived without compressing the destination address.

* * * * *